(12) United States Patent
Antipa

(10) Patent No.: US 11,050,851 B2
(45) Date of Patent: Jun. 29, 2021

(54) DRAG-AND-DROP CLIPBOARD FOR HTML DOCUMENTS

(71) Applicant: Adobe Inc., San Jose, CA (US)

(72) Inventor: Damien Antipa, Saint-Louis (FR)

(73) Assignee: Adobe Inc., San Jose, CA (US)

( * ) Notice: Subject to any disclaimer, the term of this patent is extended or adjusted under 35 U.S.C. 154(b) by 1771 days.

(21) Appl. No.: 13/873,401

(22) Filed: Apr. 30, 2013

(65) Prior Publication Data

US 2014/0324943 A1 Oct. 30, 2014

(51) Int. Cl.
| | |
|---|---|
| H04L 29/06 | (2006.01) |
| H04L 29/08 | (2006.01) |
| G06F 3/048 | (2013.01) |
| G06F 3/0482 | (2013.01) |
| G06F 3/0486 | (2013.01) |
| G06F 9/54 | (2006.01) |
| G06F 40/166 | (2020.01) |

(52) U.S. Cl.
CPC ............ *H04L 67/42* (2013.01); *G06F 3/048* (2013.01); *G06F 3/0482* (2013.01); *G06F 3/0486* (2013.01); *G06F 9/543* (2013.01); *G06F 40/166* (2020.01); *H04L 67/02* (2013.01)

(58) Field of Classification Search
CPC ..... H04L 67/42; G06F 17/24; G06F 17/2247; G06F 17/3089
USPC ........................................ 709/203, 223–224
See application file for complete search history.

(56) References Cited

U.S. PATENT DOCUMENTS

| | | | | |
|---|---|---|---|---|
| 5,404,442 A | * | 4/1995 | Foster | .................. G06F 3/0481 715/210 |
| 6,591,295 B1 | * | 7/2003 | Diamond | .......... G06F 17/30017 707/999.003 |

(Continued)

FOREIGN PATENT DOCUMENTS

| | | |
|---|---|---|
| GB | 1404032.3 | 8/2014 |
| WO | 2008100939 A1 | 8/2008 |
| WO | 2013050077 A1 | 4/2013 |

OTHER PUBLICATIONS

Combined Search and Examination Report under Sections 17 and 18(3). Issued by GB Intellectual Property Office. Report dated Aug. 22, 2014 for GB Application—GB1404032.3. 9 pages.

(Continued)

*Primary Examiner* — Kevin T Bates
*Assistant Examiner* — Emad Siddiqi
(74) *Attorney, Agent, or Firm* — Finch & Maloney PLLC

(57) ABSTRACT

Techniques are disclosed for editing pages in a client-server architecture, such as in the context of cloud-based webpage editing applications. In one embodiment, a Clipboard Module running in the client browser is invoked in response to a copy operation that is requested with respect to a selected piece of content on a given page presented at the client. The Clipboard Module is configured to store the copied content in a local storage, and to also present a UI clipboard element for viewing by the user. The UI clipboard element can be dragged-and-dropped at a target drop location within the document being edited. A drop zone indicator can be visually displayed so that user can see where the clipboard content will be placed upon release of the drag-and-drop operation. Upon release, the clipboard content is pasted or otherwise inserted into the DOM of the target page at the current drop zone.

21 Claims, 14 Drawing Sheets

(56) References Cited

U.S. PATENT DOCUMENTS

| | | | | |
|---|---|---|---|---|
| 7,509,577 | B2* | 3/2009 | Kuwata | G06F 40/166 715/256 |
| 7,698,631 | B1* | 4/2010 | Toebes | G06F 17/2247 715/234 |
| 7,934,152 | B2* | 4/2011 | Krishnamurthy | G06F 17/2211 715/202 |
| 8,375,294 | B2* | 2/2013 | Toebes | G06F 17/24 715/229 |
| 8,555,187 | B2* | 10/2013 | Margolin | H04L 67/10 715/770 |
| 8,666,961 | B1* | 3/2014 | Qureshi | G06F 17/30312 707/705 |
| 2001/0020243 | A1* | 9/2001 | Koppolu | G06F 17/30855 715/205 |
| 2003/0065638 | A1* | 4/2003 | Robert | G06F 3/0486 |
| 2003/0074634 | A1* | 4/2003 | Emmelmann | G06F 8/315 715/255 |
| 2003/0115546 | A1* | 6/2003 | Dubey | G06F 17/30014 715/202 |
| 2004/0078431 | A1* | 4/2004 | Ahn | H04L 12/1822 709/205 |
| 2006/0218492 | A1* | 9/2006 | Andrade | G06F 17/24 715/234 |
| 2007/0283251 | A1* | 12/2007 | Pally | G06F 17/24 715/234 |
| 2008/0072157 | A1* | 3/2008 | Pally | G06F 17/30899 715/738 |
| 2008/0141136 | A1* | 6/2008 | Ozzie | G08B 21/22 715/723 |
| 2008/0256601 | A1* | 10/2008 | Dutta | G06F 21/554 726/3 |
| 2009/0187842 | A1 | 7/2009 | Collins et al. | |
| 2011/0072344 | A1 | 3/2011 | Harris et al. | |
| 2012/0174002 | A1* | 7/2012 | Martin | G06F 9/451 715/763 |
| 2013/0060858 | A1* | 3/2013 | Freishtat | G06Q 30/02 709/204 |
| 2014/0040862 | A1* | 2/2014 | Webster | G06F 8/61 717/121 |
| 2014/0304839 | A1* | 10/2014 | Hansen | G06F 21/6209 726/29 |

OTHER PUBLICATIONS

ANDRIS9, "Removed localStorage polyfill, added new tests", GitHub Comment retrieved from <https://github.com/andris9/jStorage/commit/155e16037c46fed92311592983e25ab62ccab6d9> (Mar. 14, 2013).

Fielding et al., "Hypertext Transfer Protocol—HTTP/1.1", Network Working Group Request for Comments (RFC) 2616 (Jun. 1999).

Reinmann, "jStorage—store data locally with JavaScript", retrieved from <http://www.jstorage.info/> on Oct. 26, 2015.

Vieriu et al., "Adobe AIR, Bringing Rich Internet Applications to the Desktop", arXiv preprint arXiv:0906.0869 (2009).

W3C, "HTML5: A vocabulary and associated APIs for HTML and XHTML", W3C Candidate Recommendation, Chapter 6 ("Web Application APIs") (Dec. 17, 2012).

W3C, "HTML5: A vocabulary and associated APIs for HTML and XHTML", W3C Candidate Recommendation, Chapter 7 ("User Interaction") (Dec. 17, 2012).

* cited by examiner

DRAG-AND-DROP CLIPBOARD FOR HTML DOCUMENTS

FIELD OF THE DISCLOSURE

This disclosure relates to computer network-based communications, and more particularly, to techniques for managing page editing and interaction between a client and server.

BACKGROUND

The client-server architecture is a common approach to networking and communications between computer systems. Numerous applications and functions, such as cloud-based document repositories and services, email, and Internet-based communications all can be implemented using client-server architecture. In general, a client can be any computer (e.g., desktop, laptop, tablet, smartphone, etc) or computer program that queries a server to make use of a resource, and a server is a computer system configured to share its resources with requesting clients. Example resources that can be shared between a server and client are numerous and virtually unlimited, including data (e.g., information databases and blogs), data storage systems (e.g., repositories for storing and organizing client files and data), and processing capability (e.g., central processing unit and/or graphics processing unit), to name a few. Client and server computing systems typically communicate with one another in a request-response protocol, where the client sends a request and the server returns a response to that request.

As is further known, a browser is a client-side application commonly used to initiate client requests to a server, wherein a desired resource of the server is identified by a Uniform Resource Identifier (URI) and may be, for example, a webpage, image, video or other consumable content. As is further known, a uniform resource locator (URL) is a type of URI that defines the network location of a specific representation for a given resource, and also defines the file extension that indicates what content type is available at the URL. Although browsers are primarily used for Internet-based communications, they can also be used to access file systems as well as information provided by servers in private networks. As is further known, HyperText Markup Language (HTML) is the main markup language for creating pages and other information that can be displayed in a browser, and HTML elements are the building blocks of most websites. HTML allows objects and content to be embedded and can be used to create interactive forms, and provides a mechanism for creating documents by specifying structural semantics for text such as headings, paragraphs, links, and other items. HTML can also embed scripts (e.g., such as JavaScript-based code) which affect the behavior of a given HTML page at the client.

DETAILED DESCRIPTION

Figure 1A:
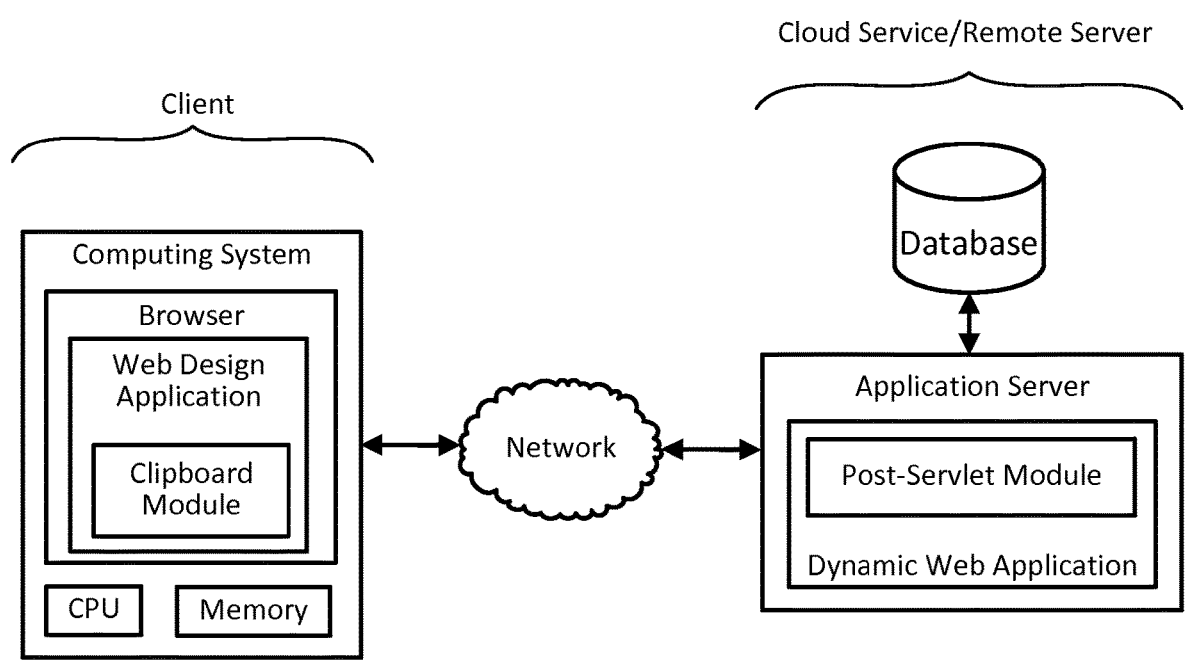
FIG. 1a illustrates a cloud-based page editing system configured in accordance with an embodiment of the present invention.

Techniques are disclosed for editing pages in a client-server architecture, such as in the context of cloud-based webpage editing applications. In one such embodiment, a Clipboard Module served to and running in a client browser (e.g., JavaScript) is invoked in response to an edit operation such as a copy or cut (or other such operation that can use an intermediate content holding location) that is requested with respect to a selected piece of content on a given page presented at the client. The content may be, for example, any object such as text, an image, a graphic, or an embedded file (e.g., video or audio). The Clipboard Module is configured to store the copied content in a browser session storage or other suitable local storage, and to also present a user interface (UI) clipboard element representative of that content storage that is accessible to the user. In particular, the UI clipboard element can be dragged-and-dropped at a target drop location within the document being edited. In some embodiments, a drop zone indicator is visually presented so that user can see where the clipboard content will be placed upon release of the drag-and-drop operation. Upon release of the drag-and-drop, the clipboard content is pasted or otherwise inserted into the page at the current drop zone. If multiple pieces of content are represented in the clipboard, a user prompt may be provided allowing the user to choose specific pieces, in accordance with some embodiments. Alternatively, all pieces of content can be pasted by default.

General Overview

Managing webpage state and interaction between a client and server is generally a difficult problem for website developers. One common approach is to use Ruby to generate JavaScript code, which is sent by server in response to a client request. With such an approach, Ruby code effectively renders instructions and the resulting JavaScript renders the page data. With respect to web-based page editor systems, as user (e.g., website developer) at a given client computer system can access a given page editing application provided by a server and use that application to develop pages of a website. During a page editing process, relocating content from one location on a page to another location on that page is done through a series of cut/copy and paste functions with mouse or keyboard interaction. For instance, a typical page editing system provides multiple user interface buttons to achieve exact positioning of the content to be pasted, such as an "insert before element" button and an "insert after element" button. Thus, placing the content in the desired location can be complicated or otherwise involve multiple steps and user-actions.

Thus, and in accordance with an embodiment of the present invention, techniques are provided herein for editing pages in the context of a client-server architecture. The techniques can be implemented, for example, with code that is embedded within a page and executes within a browser of the client computer so as to allow drag-and-drop functionality with respect to placement of content on a given page. The pages may be, for example, webpages provided by a server and accessible to a client via the Internet, or pages provided by a server and accessible to a client only via a private network (such as a company-wide internal network). One example embodiment of the invention can be implemented, for instance, in or otherwise used in conjunction with a cloud-based webpage editing application, such as Adobe® Dreamweaver® or any other web design application that allows for editing of pages that can be served to a client computing system. As will be appreciated in light of this disclosure, a website developer can interact with and edit the served pages of a given website as desired including movement of content within the pages making up that website, with corresponding updates provided back to the server.

In some such embodiments, a Clipboard Module is integrated with the page editing application, and a servlet configured to execute on an application server effectively serves the page editing application with the Clipboard Module to the client. In this way, the page editing application including the Clipboard Module is executable within the browser on the client-side. This client-side Clipboard Module can be invoked, for example, in response to an edit operation such as a copy or cut operation (or any other operation that involves moving or copying content to a holding or otherwise intermediate location) that is requested with respect to a selected piece of currently displayed content (e.g., text, graphic, image, embedded file, or other selectable page content) on a given page presented at the client. The Clipboard Module is programmed or otherwise configured to store the target content in a browser session storage or other suitable local storage or memory location at the client, and to also place a user interface (UI) element representative of that storage on the page for viewing by the user, such as a virtual clipboard (generally referred to herein as a UI clipboard element or clipboard). The Clipboard Module may be further configured to annotate the UI clipboard element to provide a degree of feedback to the user, such as the number and/or names of content pieces stored therein.

In response to the user dragging and dropping the UI clipboard element, the Clipboard Module is further configured to execute a corresponding drag-and-drop operation so as to place content represented in the UI clipboard element at a target drop location within the document being edited, which may be on the same page or a different page. The drag-and-drop operation may be carried out, for example, via a mouse click-and-hold action for cursor based user interface systems, or a tap-and-hold action for touchscreen based user interface systems. Other suitable user interface mechanisms can be used to carry out the drag-and-drop operation, as will be appreciated in light of this disclosure. In any such cases, the user can drag or otherwise move the UI clipboard element around on the screen and drop it at a target location for the content in the UI clipboard element. Anytime a page is loaded, the Clipboard Module is initialized and reads from the session storage (or other local storage), so the UI clipboard element is available across all pages of a given site and for all HTTP requests, in accordance with an embodiment. In some cases, a drop zone indicator can be visually displayed so that user can see where the clipboard content will be placed upon release of the drag-and-drop operation. For instance, if the UI clipboard element is moved above a position where the stored content can be inserted, then a pre-defined field below the UI clipboard element appears which indicates where the content can be placed. In this way, pre-defined fields of a given page can be provisioned (e.g., via a page template) so that the user is only able to drop the clipboard within one of those pre-defined fields. Conventional drag-and-drop functionality and target location highlighting can be used, as will be appreciated in light of this disclosure.

Upon release of the UI clipboard element, the clipboard content can be pasted or otherwise inserted into the document object model (DOM) of the target page at the current position or closest pre-defined field. In one such example embodiment, the Clipboard Module is configured to generate an HTTP Post request in response to release of the UI clipboard element, the request including the clipboard content (or an otherwise selected piece of content represented within the clipboard). A Post-servlet Module at the server can be programmed or otherwise configured to process the Post request and provide a response back to the client. The Clipboard Module can be further configured to insert the returned content into the DOM at the target drop location, in accordance with an embodiment. As is known, a DOM is an application programming interface that generally defines the logical structure of a document (e.g., HTML and XML webpages/documents) and the way that document is accessed and manipulated. The DOM allows a website developer to build a webpage, navigate its structure, and add, modify, or delete elements and content.

System Architecture

FIG. 1a illustrates a cloud-based page editing system configured in accordance with an embodiment of the present invention. As can be seen, the system includes a dynamic web application executable on an application server and programmed or otherwise configured to interact with a client that is communicatively coupled to the application server via a network, and to provide a Web Design Application to the user of the client. The client includes a user computing system having a processor (CPU) and memory, and a browser application that can be used to access via the network the web design application and resources of the application server (including the database). Requested content may be provided in complete page form including any number of components, or a partial page such as one component of a given page. As can be further seen, the dynamic web application includes a Post-Servlet Module that is configured to process Post requests and post the related content to the database. The dynamic web application may further include other functional modules as will be appreciated, such as a Get-Servlet Module (for processing Get requests and retrieving content from the database) and other modules such as those related to conventional page editing and that can be employed by the client-side Web Design Application. In addition, pages served by the application server in response to requests from the client include one or more renderable components as well as instructions/code generally referred to herein as a Clipboard Module that is executable in the client browser (e.g., JavaScript applet or other suitable code). Such a client-server arrangement may be suitable, for example, for any online page editing service (e.g., cloud-based website design and editing tools and applications), or any other network-based system where it is desirable to allow a client to copy or cut or otherwise move content on a given page or from page to page of a given website. Numerous configurations and variations on the depicted arrangement will be apparent in light of this disclosure.

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet, smartphone, or other suitable computing device capable of accessing a server via a network and displaying content to a user. The computing system may employ any number of suitable user input mechanisms, such as a mouse, keyboard, touch screen, trackpad, voice-activated command interface, or any combination thereof. The browser application can be implemented using any number of known or proprietary browsers or comparable technology that facilitates retrieving, presenting, and traversing information resources on a network, such as the Internet, and which allows for the execution of page-embedded code such as a page editing system including the Clipboard Module. The database can be, for example, a Java content repository (JCR) or any other suitable storage facility accessible to the server.

The Clipboard Module is integrated with or otherwise operates in conjunction with the Web Design Application (e.g., page editing application) to provide drag-and-drop clipboard functionality as variously described herein. As will be appreciated in light of this disclosure, the local storage or memory where content of the UI clipboard element is stored persists across all pages and all HTTP requests (e.g., Post and Get requests, etc). Further details of an example system configured in accordance with an embodiment of the present invention and including a Clipboard Module and a Post-Servlet Module will be provided in turn with reference to FIGS. 1b, 2, 3, and 4a-4h each of which will be discussed in turn.

As will be appreciated in light of this disclosure, the various modules and components of the system shown in FIG. 1a, such as the Clipboard Module, Web Design Application, and Post-Servlet Module, can be implemented in software, such as a set of instructions (e.g., C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used. In one specific embodiment, the Clipboard Module of the Web Design Application is implemented with JavaScript or other downloadable code that can be provisioned in real-time to a client requesting access to the application server, and the Post-Servlet Module is implemented with Java or C++. Numerous other specific configurations can be used, as will be apparent in light of this disclosure.

Figure 1B:
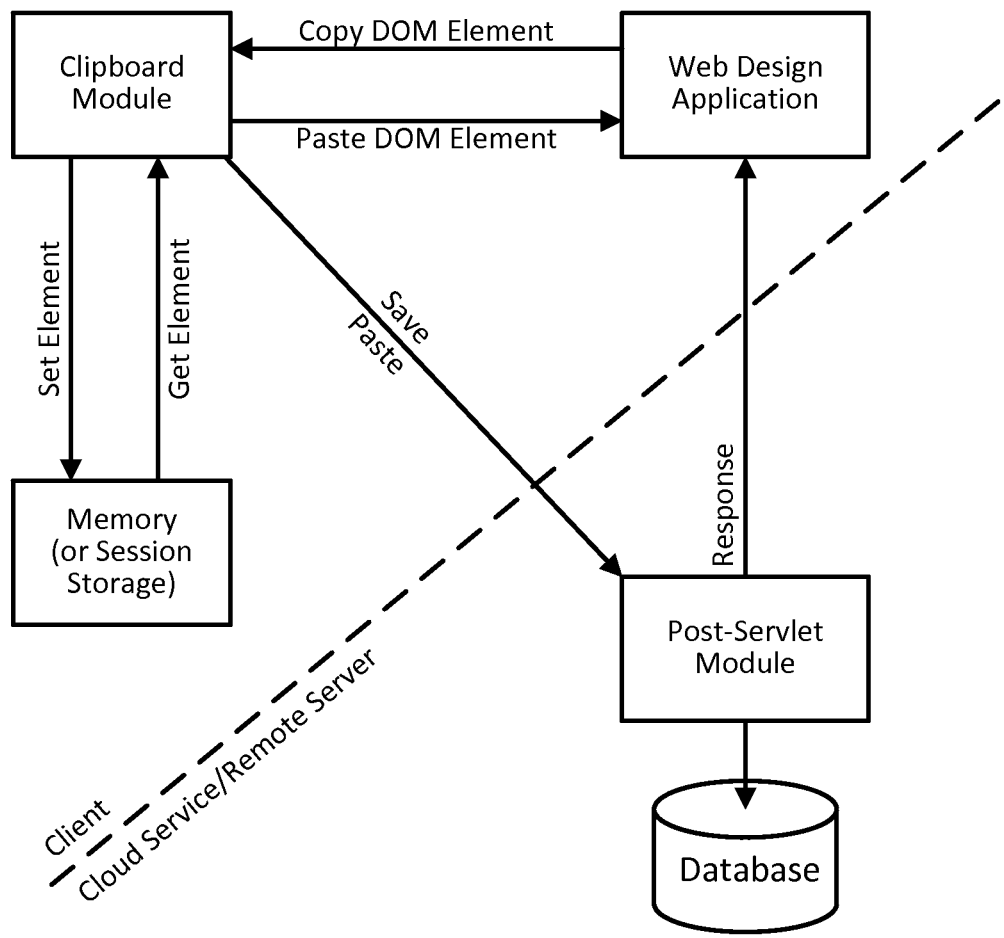
FIG. 1b illustrates a sequence of interactions between the components of the cloud-based page editing system shown in FIG. 1a, in accordance with an embodiment of the present invention.
Figure 4A:
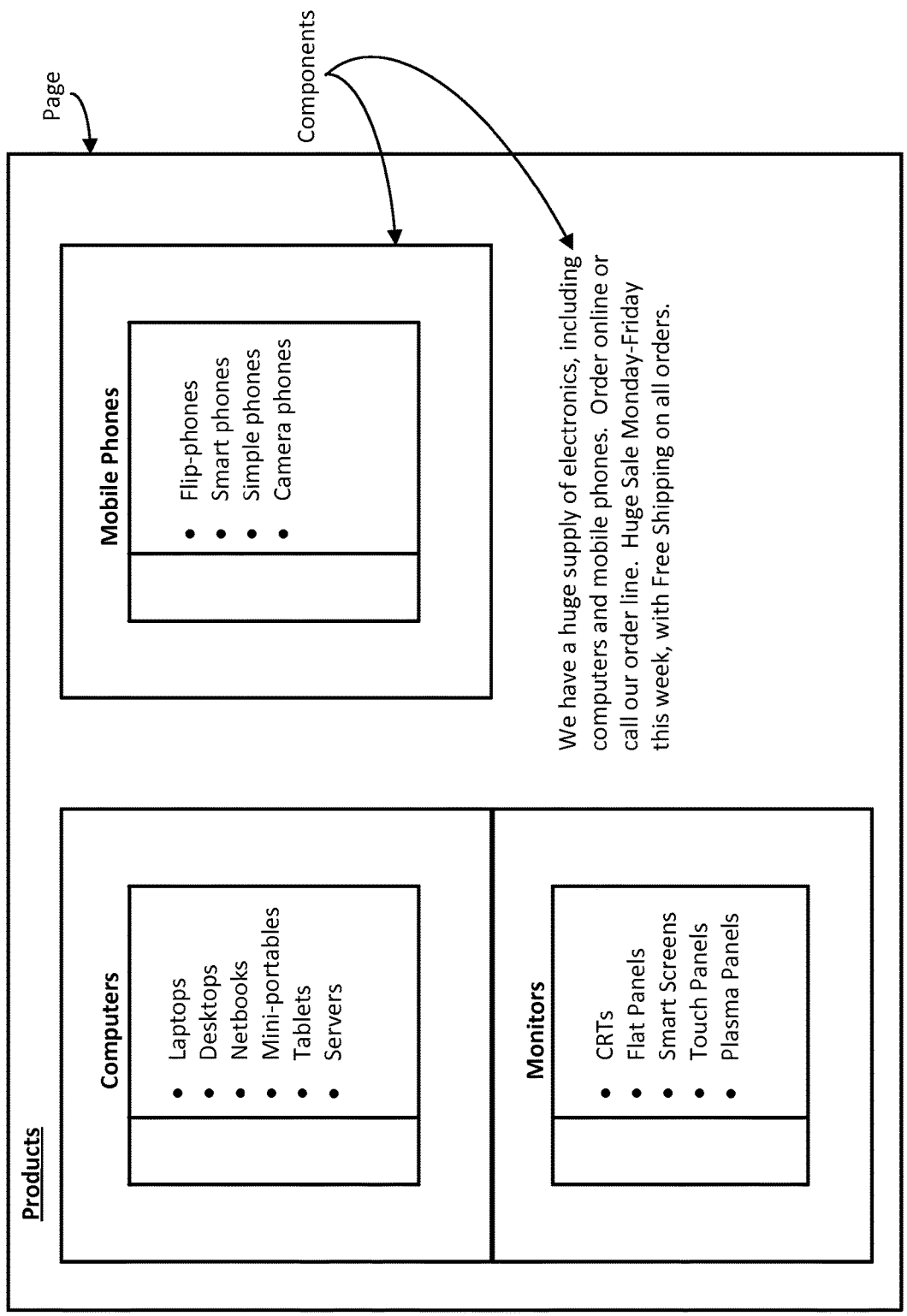
FIGS. 4a-4h show a series of page screen shots that collectively illustrate a page editing process in accordance with an embodiment of the present invention.
Figure 4B:
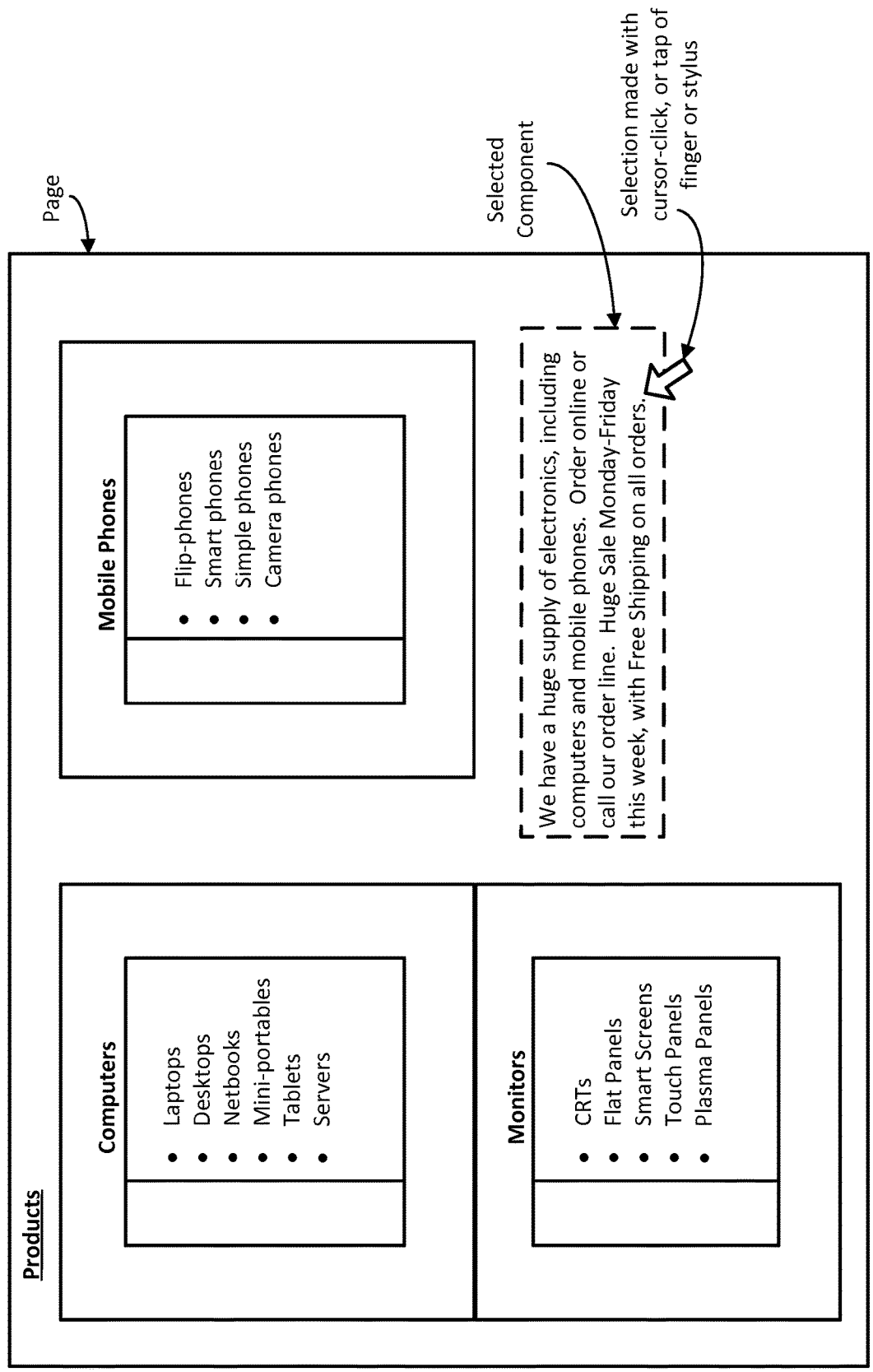

FIG. 1b illustrates a sequence of interactions between the components of the cloud-based page editing system shown in FIG. 1a, in accordance with an embodiment of the present invention. For purposes of discussion, assume an initial page request from the client has already been received by the server and that the server has responded by sending the requested page. Further assume that the requested page includes a number of renderable component(s) which the user can select, such as text, graphics, images, embedded video, embedded audio, or any combination thereof and/or other objects, and that the user is developing a products website for potential consumers to access and make product purchase. One example page is shown in FIG. 4a, which includes a products page showing a number of components that can be selected and evaluated by a consumer interested in purchasing the various corresponding products (computers, mobile phones, and monitors in this example case). The selectable components may be, for example, in the form of hyperlinks that when selected cause additional content or pages to be provided to the consumer, as normally done (any suitable website navigation techniques and structure can be used). In addition, there is some informational text that the potential consumer can see.

Now, assume that the user developing the website wishes to refine the page via an edit operation that includes copying content from one page location to another page location, and has selected that content using any suitable content selection mechanism. For instance, and with reference to the example embodiment shown in FIG. 4b, the user has selected the paragraph of informational text using a cursor-based action (e.g., double-click on target paragraph, or a click-drag-and-release action across the target paragraph). Alternatively, for a touchscreen configuration, the paragraph of text can be selected using a finger or stylus action over the paragraph, for instance. In a more general sense, any given DOM element can be selected by the user.

Figure 4C:
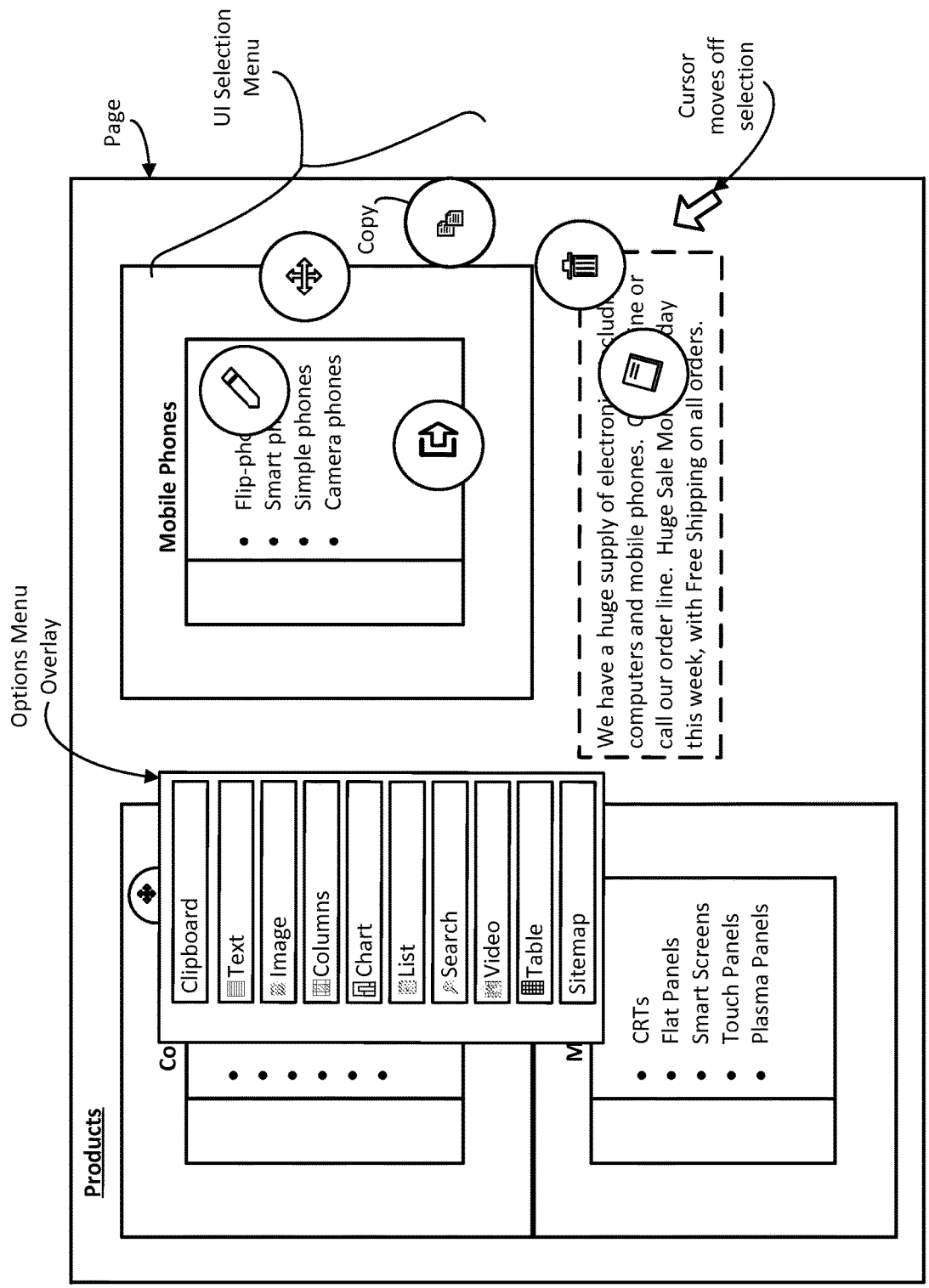

Once target content is selected, the website developer/user may initiate an editing operation on it. For instance, in one example embodiment, an editing UI interface is automatically invoked and presented to the user in response to a content selection being made. For example, one such embodiment is shown in FIG. 4c, wherein in response to a content selection being made, the Web Design Application is configured to present an Options Menu Overlay and a UI Selection Menu to the user. As can be seen in this example case, one of the UI Selection Menu options is a copy button, with other buttons including any number of desired or otherwise typical functions (e.g., move, draw, delete, close menu, etc). In addition, the Options Menu Overlay includes a number of tool or functional options, including a Clipboard element at the top of the menu along with other example functional elements (e.g., Text, Images, Columns, etc).

Figure 4D:
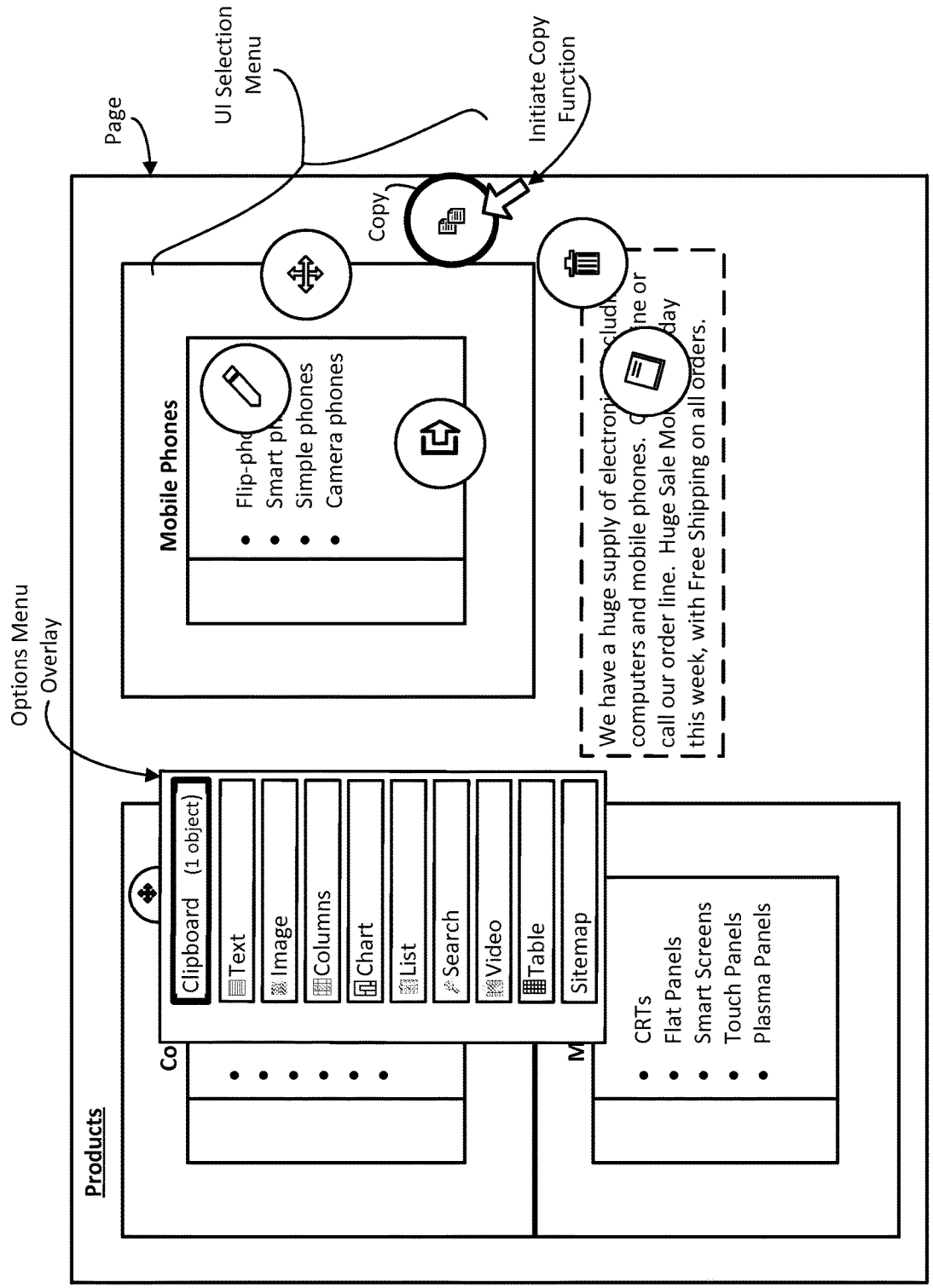
Figure 4D:
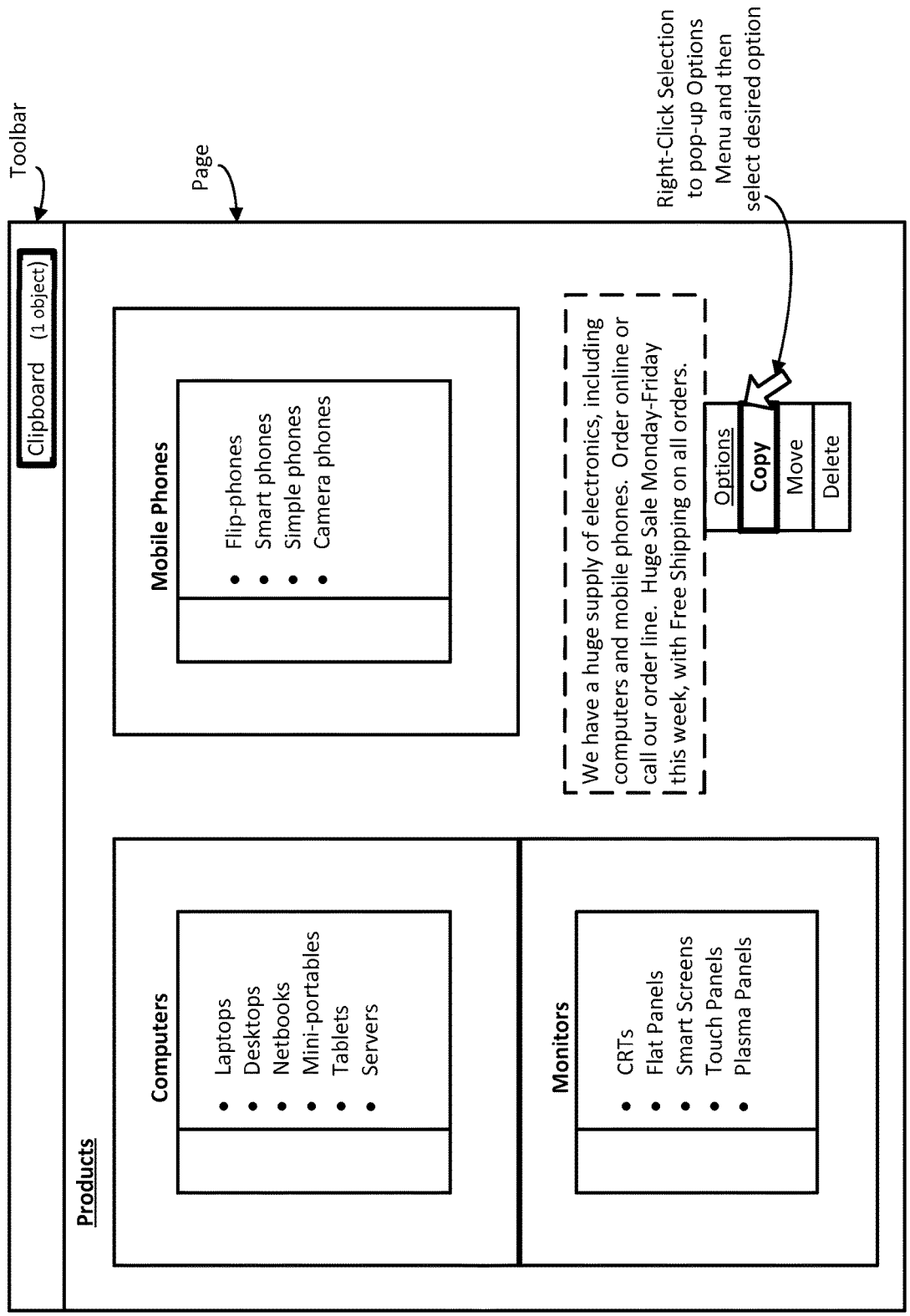

Continuing with reference to the example embodiment shown in FIG. 4d, in response to the user clicking or otherwise selecting the copy button of the UI selection menu, the Web Design Application is configured to trigger a copy function call to the Clipboard Module, as shown in FIG. 1b (Copy DOM Element). In response, the Clipboard Module is configured to implicitly trigger a save operation (Set Element) in the browser session storage or other suitable local storage or memory, as further shown in FIG. 1b. In this way, the stored content is available across all pages of the site and all HTTP requests. In addition, the Clipboard Module of this example embodiment is configured to update the presentation of the Clipboard element of the Options Menu Overlay to reflect that the Clipboard element now includes 1 object (i.e., the selected text just copied).

As will be appreciated in light of this disclosure, other embodiments may include different editing tools/functions and invocation schemes as well as a different look and feel. For instance, some web design applications may include various available editing options (e.g., copy, cut, delete, move, etc) configured into a toolbar that is accessible to the user somewhere on the page (e.g., top or bottom of page). This tool bar may be present at all times, or only after a user content selection is made if so desired. In other example embodiments, such as the one shown in FIG. 4d', the user can right-click on selected content and be presented with an edit options pull-down menu, including a copy function. As can be further seen, one the user selects the copy option of the pull-down menu, the Clipboard element displayed in the toolbar at the top of the page is annotated ('1 object') to reflect that target content has been copied to the memory. Numerous other such UI control features and layouts can be provisioned with a drag-and-drop element as described herein, using any known or custom technologies as will be appreciated in light of this disclosure.

Figure 4E:
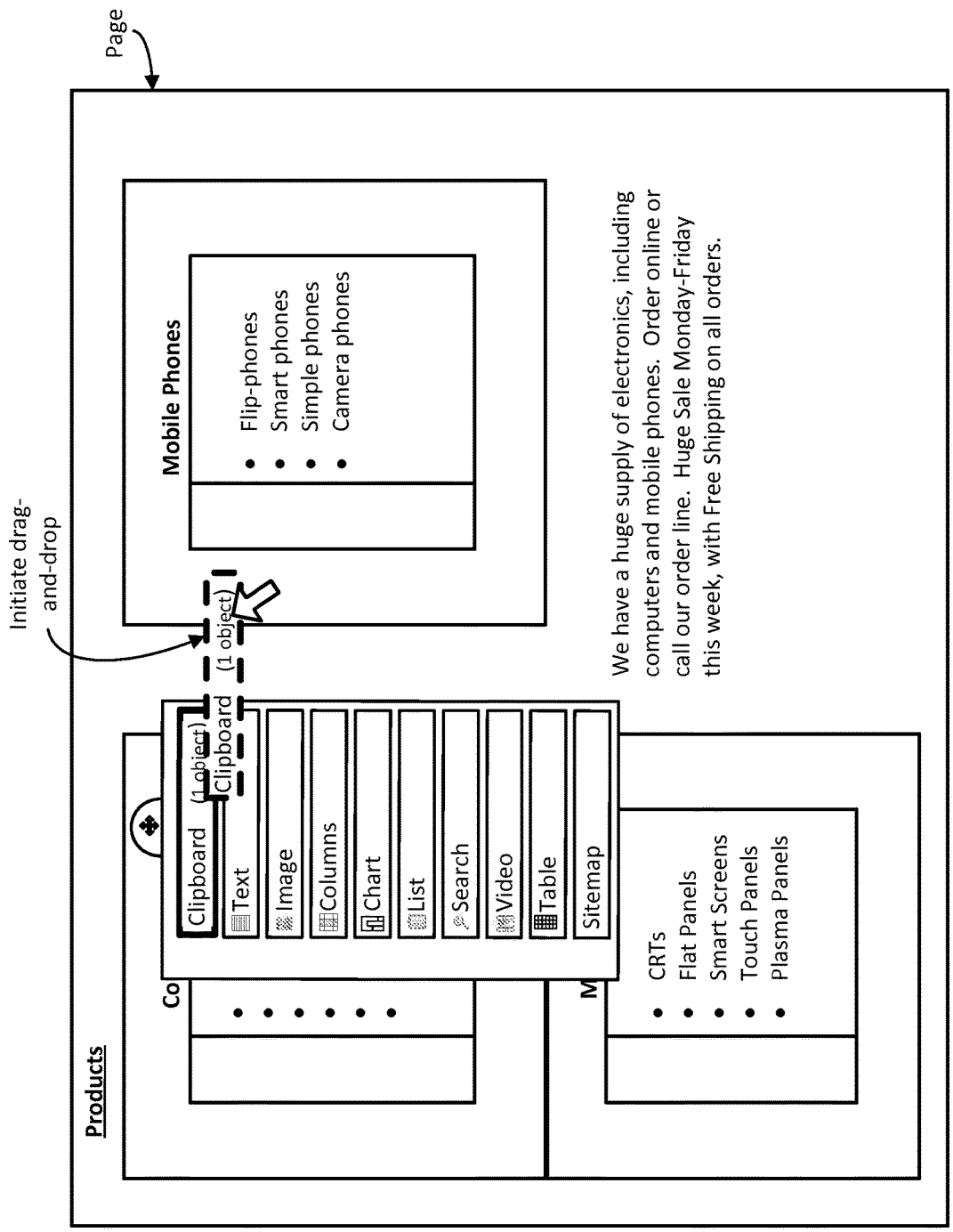
Figure 4F:
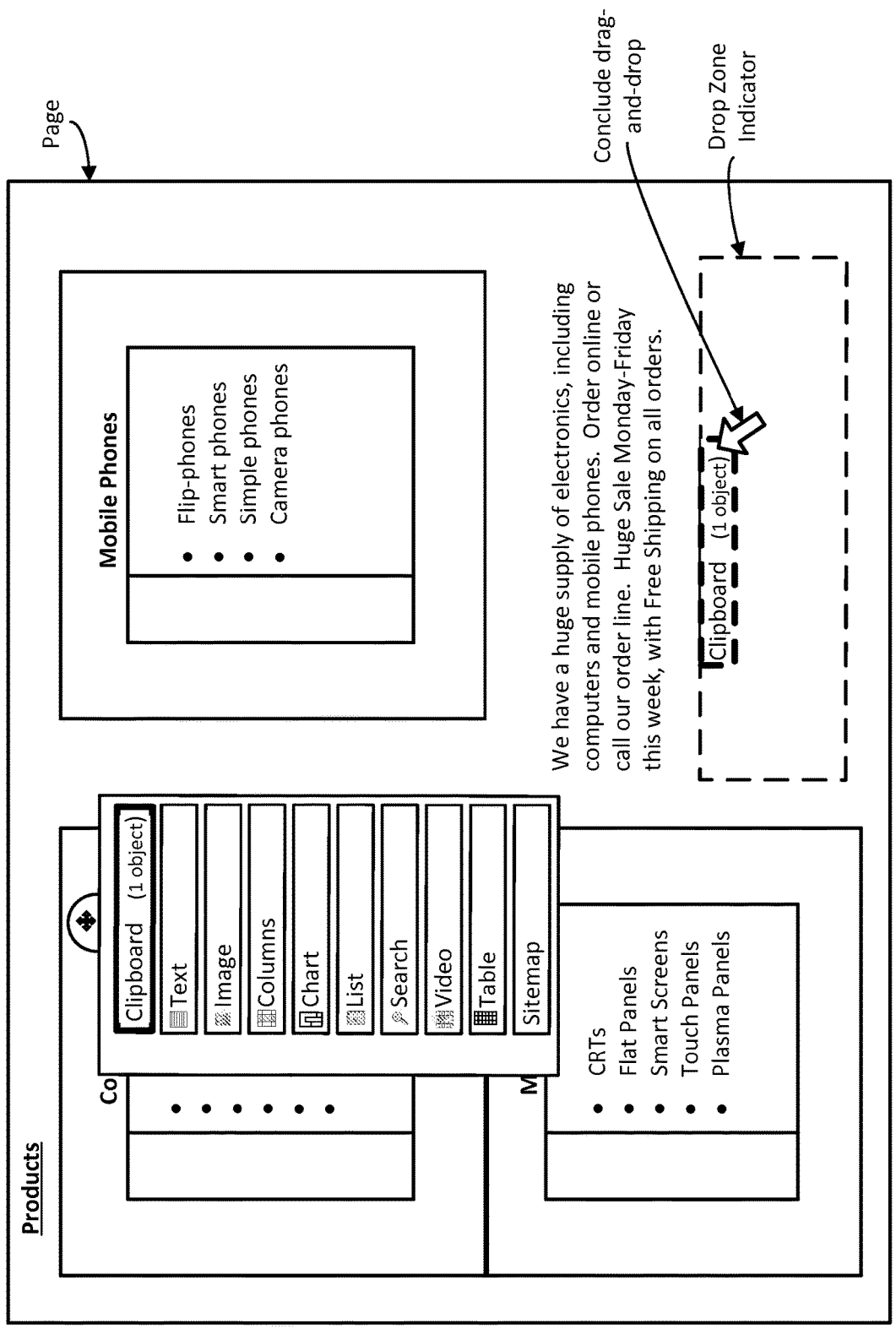
Figure 4F:
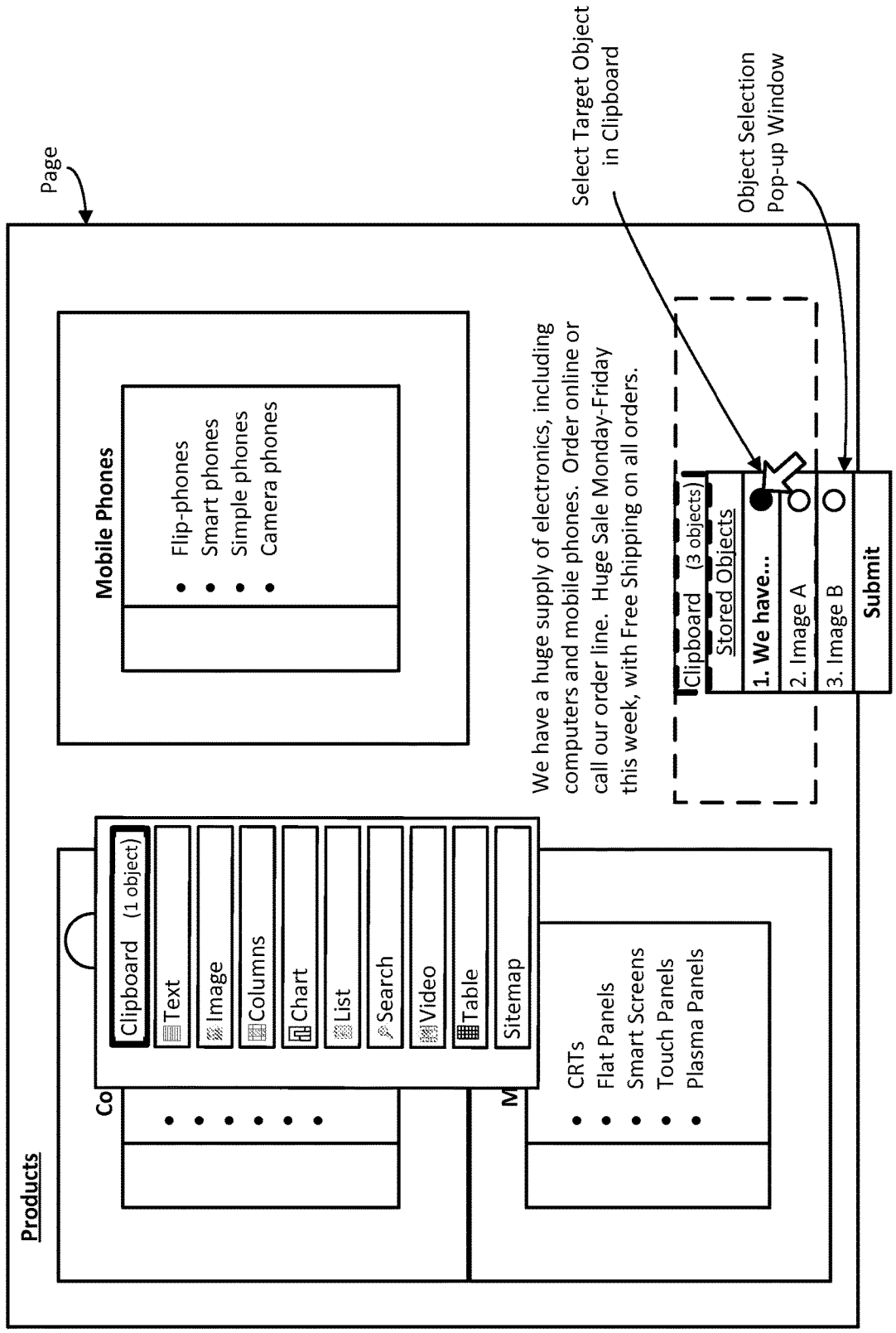

In any such cases, the user may now drag the Clipboard element presented on the screen to a target location within a given page of the site and drop the Clipboard element at that location, as generally shown in FIG. 4e. In some such embodiments, as the user drags the Clipboard element around, the Web Design Application can be configured to highlight target drop zones in which the element can be dropped as the element is passed over or otherwise sufficiently near those zones. FIG. 4f shows one such example embodiment using highlighted drop zone indicators. As previously explained, the pre-defined zones can be part of the DOM or template used to make the given page, and are known to the Web Design Application such that real-time highlighting can be readily provided. Such drop zone highlighting can be used to give the user a better indication of where the content will be placed upon release of the drag operation.

Upon release of the drag operation, the process of inserting the stored DOM element(s) represented in the Clipboard element at the target drop zone indicator of the target page may be executed. For example, and with further reference to FIG. 1b, in response to the release of the drag-and-drop operation, the Clipboard Module implicitly sends an AJAX Post request (e.g., Save/Paste) to the server and also notifies the Web Design Application of the Post request (Paste DOM Element). As can be further seen in FIG. 1b, the Post-Servlet Module processes the Post request (sets status and notes location of content created and rendered in response to request) and provides the server's response back to the Web Design Application, which processes the response (e.g., with respect to handling success or error) and determines where to place the received content. This request-response exchange between the client and server ensures that the content data at the server is in sync with the content data at the client. Thus, in some embodiments, note that the initial content locally pasted at the client is subsequently replaced by the content returned in the Post request, so as to effectively provide a seamless content placement. In other embodiments, the Post request may not include the rendered content but rather only returns a status. In such cases, and assuming the post request was successful, a subsequent Get request from the client can be used to retrieve the content to ensure the client-side and server-side content are in sync. In any such cases, if the server fails to successfully render the requested content (for whatever reason), then a status code indicating that failure can be used to notify the client-side, thereby triggering client-side code to remove the pasted content and to inform the user accordingly.

Figure 4G:
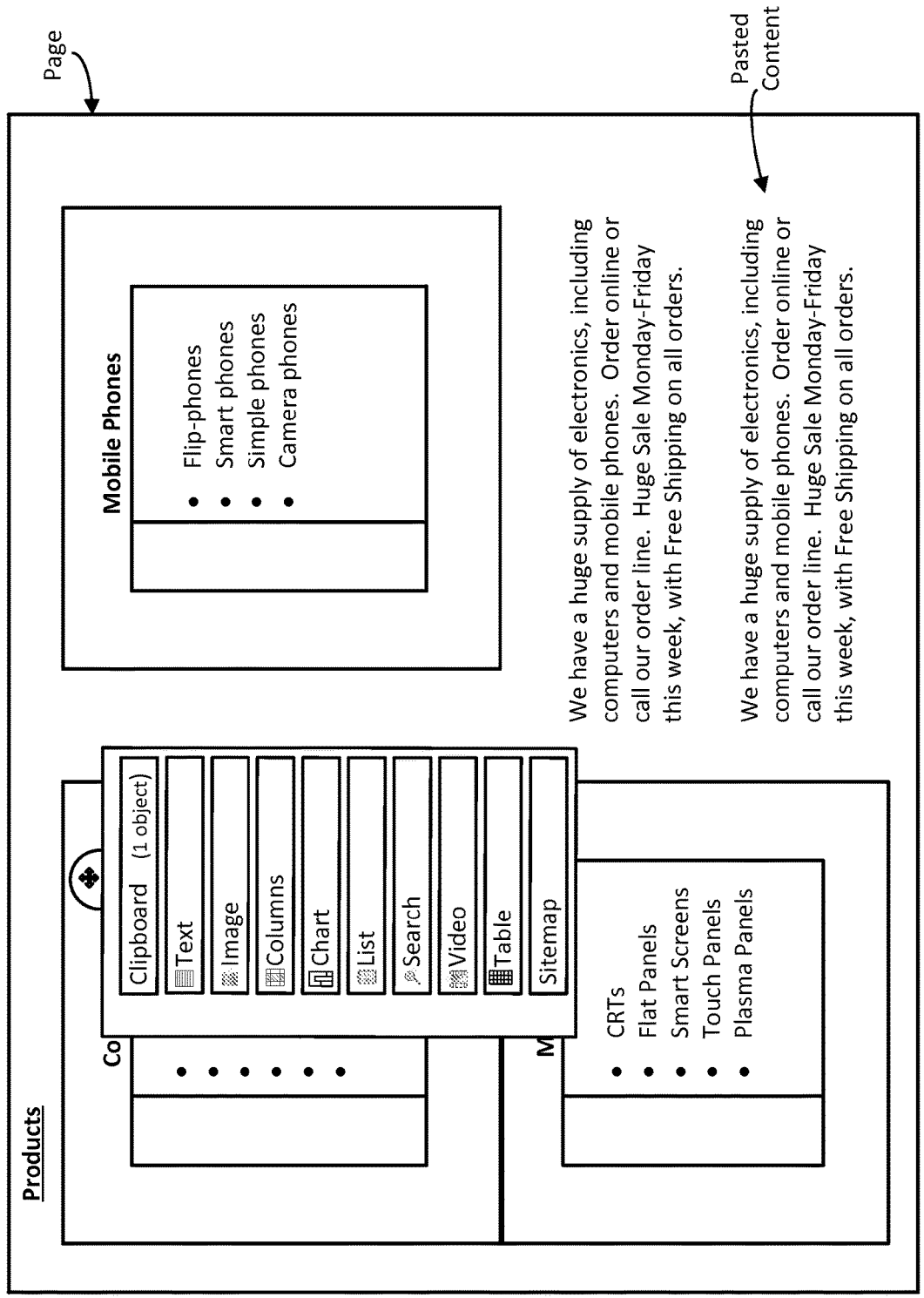
Figure 4H:
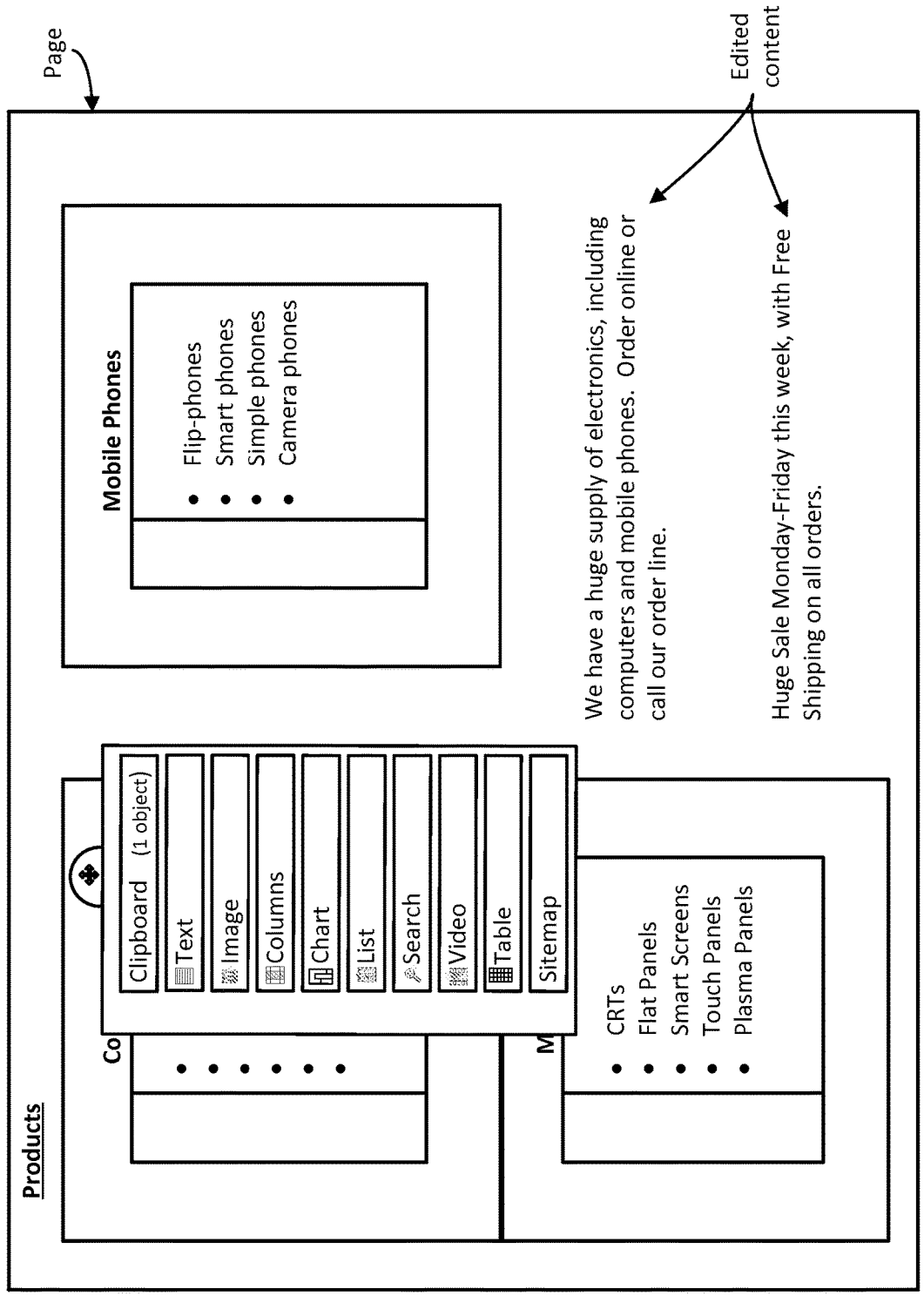

As will be appreciated, although an AJAX call and Post-Servlet Module are shown, any suitable HTTP server technology can be used (e.g., a PHP application can be used handle Post requests and decide if it is valid and further update values in the database). As will be further appreciated, this post-release processing is transparent to the user, who generally sees the content timely placed as desired, such as shown in the example of FIG. 4g. The user can then further edit or otherwise refine the content as desired, such as shown in FIG. 4h. Here the user pasted and edited the content to separate out the informational text with respect to an on-going sales event.

Note that in this example embodiment, the content was pasted on the same page from which it was copied. Further note, however, that anytime a page is loaded, the Clipboard element can be initialized and reads from the local storage (browser session storage or other local memory), so as to provide each page with a droppable Clipboard element. Thus, in other embodiments, the content can be copied from one page and pasted to another. To this end, the Clipboard Module is further configured to access the local storage to either place content therein (Set Element) or retrieve content therefrom (Get Element), as further shown in the example embodiment of FIG. 1b.

Also, as previously explained, if the Clipboard element has multiple pieces of content stored therein, the user may be given a chance to pick the desired content to be pasted, in accordance with some embodiments. For instance, upon release of the Clipboard element, the user may be prompted with a pop-up window that indicates each piece of content represented in the Clipboard element. Each element listed in the pop-up window can be associated with a UI selection mechanism (e.g., radio button or check box) that the user can select, and then select a 'submit' or 'OK' button to have those selected pieces of content pasted to the target drop location. One such example embodiment is shown in FIG. 4f.

Note that the Clipboard Module may include a degree of user-configurability that dictates functionality of the Clipboard Module, in accordance with some embodiments. For example, in some such embodiments, the user can access a configuration user interface of the Clipboard Module that allows the user to define that either all content pieces will be automatically pasted on drop or that the user will be provided with a pop-up window allowing the user to choose the desired pieces to be pasted. Such a configuration user interface can be accessed, for instance, at any time by selecting a configuration option in the tool bar or a configuration button or any other such suitable UI mechanism that can be selected so as to cause presentation of one or more configurable options that can be set by the user. Any number of functional features may be hardcoded or user-configurable, depending on desired performance and flexibility of target application, and numerous configurations will be apparent in light of this disclosure.

Methodology

Figure 2:
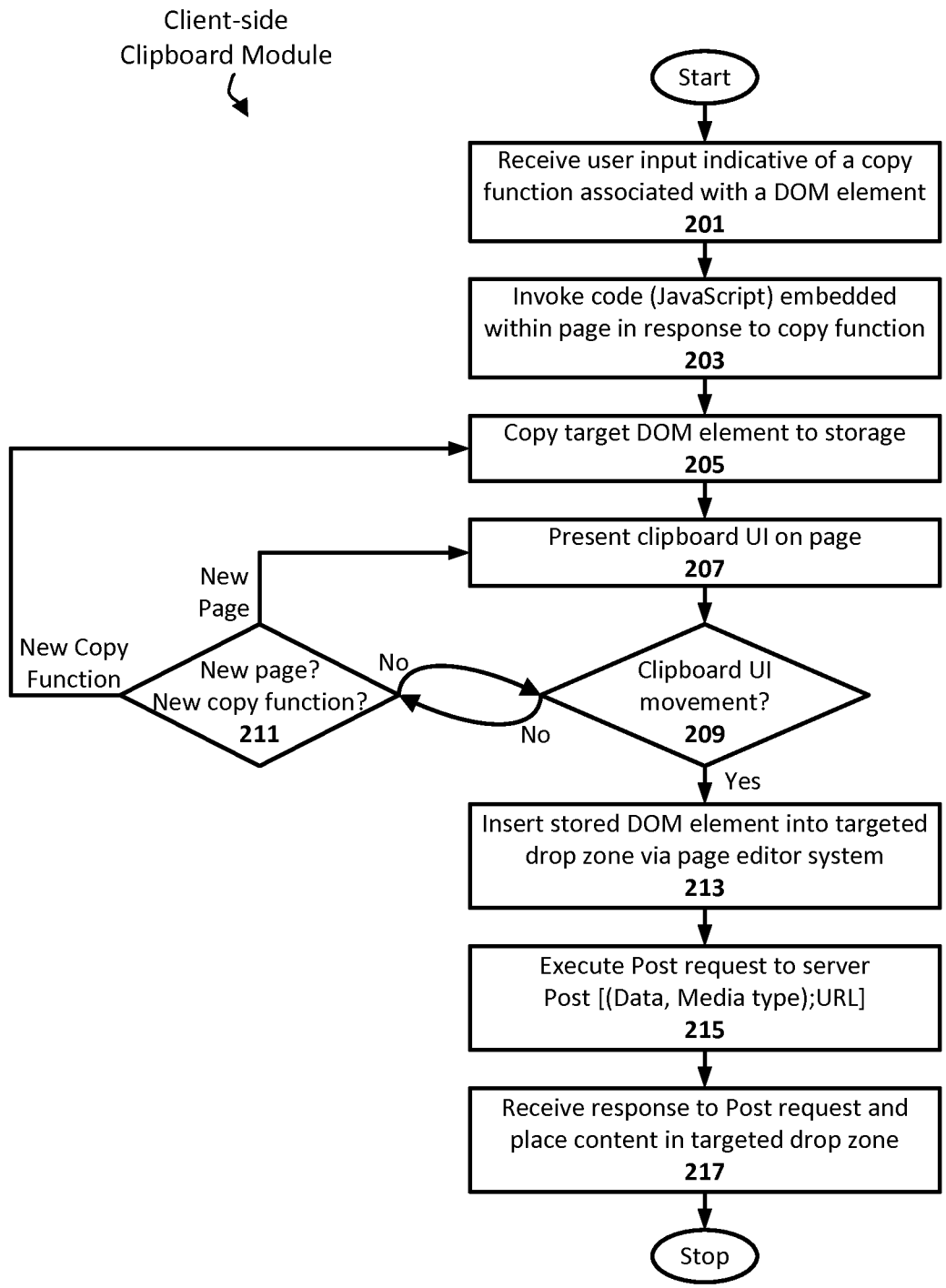
FIG. 2 illustrates a client-side methodology for processing a content editing request in accordance with an embodiment of the present invention.

FIG. 2 illustrates a client-side methodology for processing a content editing request in accordance with an embodiment of the present invention. As previously explained, the methodology can be carried out via a web design application (page editor system) or other code embedded or otherwise executable within a browser for a given page served to a client. In accordance with one such embodiment, the web design application is programmed or otherwise configured with a JavaScript application programming interface (API) or other suitable client-side code can be used to implement the methodology within a browser application executing on the client.

As can be seen, the method includes receiving 201 user input indicative of a copy function associated with a DOM element (such as shown in FIG. 4d or 4d'). The method continues with invoking 203 code (e.g., JavaScript) embedded within the page in response to the copy function being engaged, and copying 205 the target DOM element to storage (such as shown in FIG. 1b). The method continues with presenting 207 a clipboard UI element on the page (such as shown in FIG. 4d or 4d'). As further previously explained, the clipboard UI element may be annotated to indicate, for example, a number of DOM elements represented therein.

The method continues with determining at 209 if the clipboard UI element is being moved. If not, then the method continues with waiting for either movement of the clipboard UI element and continuously monitoring at 211 to see if a new page or new copy function as been selected. If no movement has occurred and a new copy function has been engaged, then the method continues at 205 as previously discussed. Thus, multiple DOM elements can be saved to the clipboard UI element, if so desired. If no movement has occurred and a new page has been accessed, then the method continues at 207 as previously discussed, so that the clipboard UI element can be presented on that page as well, if so desired.

If movement of the clipboard UI element is detected, then the method includes inserting 213 the stored DOM element into a targeted drop zone via the web design application, executing 215 a Post request to the server (such as: Post [(Data, Media type);URL], and receiving 217 a response to the Post request and placing the returned content in the targeted drop zone, such as shown in FIG. 4e, 4f or 4f', and 4g and further discussed with reference to FIG. 1b. As previously explained, a Get request may be used in conjunction with the Post request in some embodiments, such as those where the response to the Post request does not include the desired content. For example, and in accordance with one specific such embodiment, the response provided by the server (to the Post request) is exposed to a client-side module (e.g., Clipboard Module) which reads the response, and if the server confirms that the insert/post operation was successful, then the client-side Clipboard Module can be further configured to refresh the pasted/posted DOM element by sending an HTTP Get request to the server to receive the recently posted DOM element (to be in sync with the server). If the server has rejected the DOM element drop at the target drop position or otherwise indicates that the insert/post operation has failed (for whatever reason), then the Clipboard Module can be further configured to delete the temporarily pasted paragraph from the page. In one such embodiment, the Clipboard Module is further configured to give the user a visual feedback regarding the content drop failure (e.g., such as a prompt indicating that the content placement operation failed and/or presentation of appropriate fail codes and any suggested remedial action).

Figure 3:
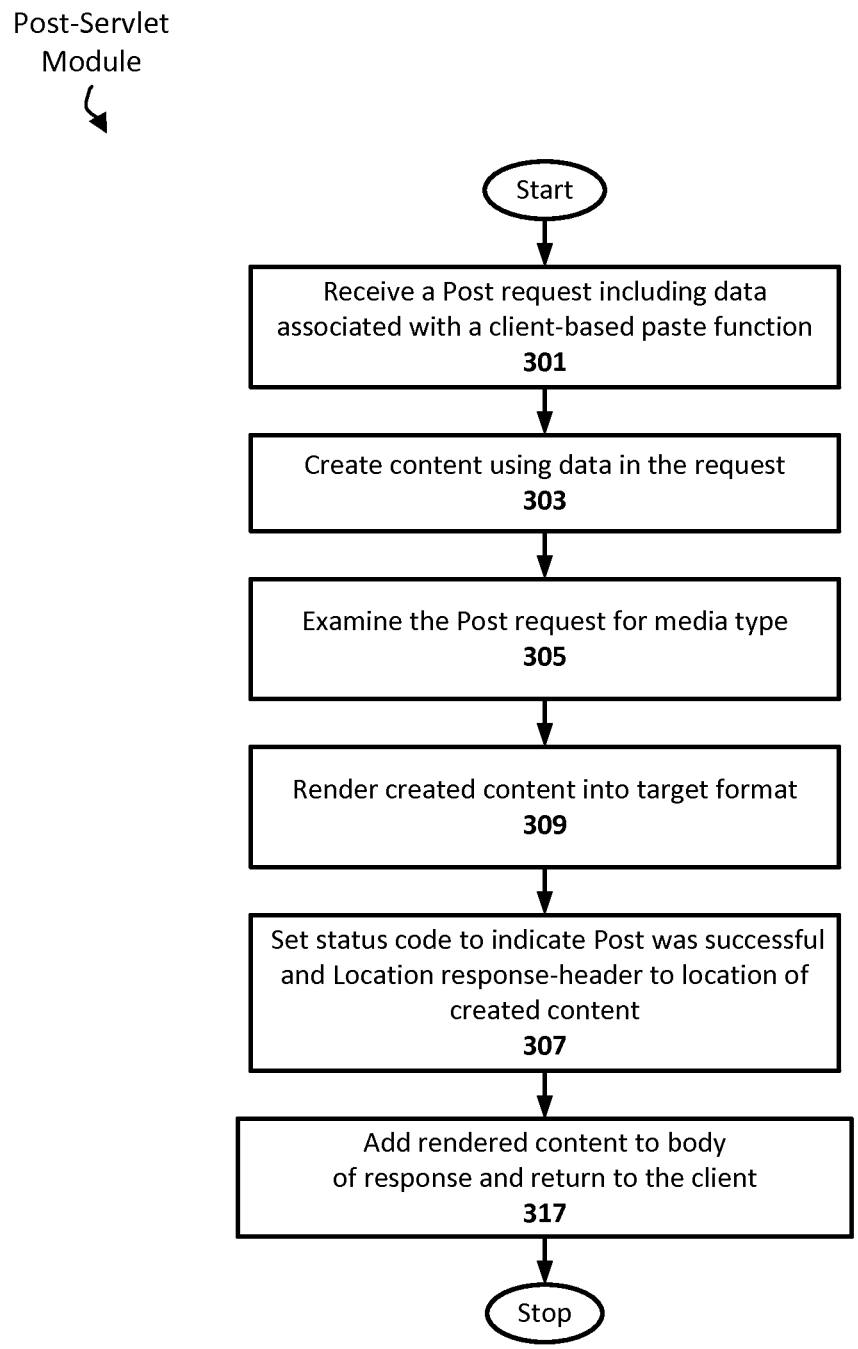
FIG. 3 illustrates a server-side methodology for processing a content editing request in accordance with an embodiment of the present invention.

FIG. 3 illustrates a server-side methodology for processing a content editing request in accordance with an embodiment of the present invention. As can be seen, this method can be carried out, for example, via a Post-Servlet Module or other code executable at the server. In accordance with one such embodiment, Java or other suitable server-side code can be used to implement the methodology.

The method includes receiving 301 a Post request including data associated with a client-based paste function, and creating 303 the desired content using data in the request. The method further includes examining 305 the Post request for a media type (e.g., HTML, XML, JSON), and rendering the created content into target format. The method further includes setting a status code (e.g., 201 status code, per HTTP specification 1.1) to indicate the Post request was successful and a Location response-header (also per HTTP specification 1.1) to location of the created content. The method further includes adding 317 the rendered content to the body of the response and returning the response to the client. The user at the client can then further edit the content of the page, as desired. In other embodiments, recall that the response to the Post request may not include the requested content. In such cases, the server can be further configured to subsequently receive a Get request and to provide the desired content created by the earlier Post request.

Thus, one embodiment of the present invention includes a client-side API which allows other modules or code to access the Clipboard element's storage (e.g., to add new content to the storage). The API can be, for example, a Javascript module executable in the browser, and the other executable modules/code corresponding to UI control elements (e.g., copy button on the toolbar or elsewhere on the page) are configured to recognize when a given UI control element has been clicked or otherwise selected and to access the API to store new elements in the clipboard, which can subsequently be dragged-and-dropped at some desired location within a page of a given website.

Numerous embodiments will be apparent in light of this disclosure, and features described herein can be combined in any number of configurations. One example embodiment of the present invention provides a computer implemented method for editing a page in a client-server arrangement. The method includes copying, by a client computing system, a selected piece of content to a local storage at the client computing system, the selected piece of content being presented on a page served to a browser of the client computing system by a server computing system with which the client computing system is in communication. The method further includes presenting, by the client computing system, a clipboard user interface (UI) element on the page, and in response to the clipboard UI element being moved to and dropped at a target location, inserting the stored selected piece of content at the target location. In some cases, in response to the clipboard UI element being moved to and dropped at the target location, the method further includes: executing a post request to the server computing system, the post request including the stored selected piece of content; and receiving a response to the post request indicating a status of the post request. In some such cases, in response to the status indicating the post request was successful, the method further includes: executing a get request to the server computing system, the get request requesting the server computing system to return content resulting from the post request; receiving a response to the get request including the requested content resulting from the post request; and refreshing content of the target location with the requested content. In other such cases, the response to the post request includes content resulting from server processing of the post request, and the method further includes refreshing content of the target location with that content. In other such cases, in response to the status indicating the post request was not successful, the method further includes at least one of: removing the content inserted at the target location; and presenting visual feedback regarding content drop failure. In some cases, the target location is on a different page than the page with the selected piece of content (of course, it may be on the same page in other cases). In some cases, the method includes presenting a drop zone indicator during movement of the clipboard UI element, the presented drop zone indicator showing where the stored selected piece of content would be inserted if the clipboard UI element was dropped at that moment. In some cases, the method is carried out by code embedded within the page and executable in the browser of the client computing system. In some cases, the method includes receiving, at the client computing system, a user input associated with the selected piece of content, thereby causing the copying and presenting to be carried out. In some cases, in response to the local storage including multiple pieces of content, the method further includes presenting a user interface mechanism configured to receive a choice of one or more of those pieces, and the stored selected piece of content that is inserted at the target location is the one or more chosen pieces. Variations will be apparent in light of this disclosure. For example, another embodiment of the present invention provides a computer program product or one or more computer readable mediums encoded with instructions that when executed by one or more processors cause a process for editing a page in a client-server arrangement to be carried out, wherein the process includes functionality as variously defined in this paragraph.

Another embodiment of the present invention provides a system for editing a page in a client-server arrangement. The system includes one or more client-side modules executable in a browser of a client computer and configured to: copy a selected piece of content to a local storage at the client computer, the selected piece of content on a page served to the client computer; present a clipboard user interface (UI) element on the page; and in response to the clipboard UI element being moved to and dropped at a target location, insert the stored selected piece of content at the target location. The system further includes a server computer configured to serve the page and the one or more client-side modules to the browser of the client computer, wherein the one or more client-side modules are embedded within the page. In some cases, in response to the clipboard UI element being moved to and dropped at the target location, the one or more client-side modules are further configured to: execute a post request to the server computer, the post request including the stored selected piece of content; and receive a response to the post request indicating a status of the post request. In some such cases, in response to the status indicating the post request was successful, the one or more client-side modules are further configured to: execute a get request to the server computer, the get request requesting the server computer to return content resulting from the post request; receive a response to the get request including the requested content resulting from the post request; and refresh content of the target location with the requested content. In other such cases, the response to the post request includes content resulting from server processing of the post request, and the one or more client-side modules are further configured to refresh content of the target location with that content. In other such cases, in response to the status indicating the post request was not successful, the one or more client-side modules are further configured to at least one of: remove the content inserted at the target location; and present visual feedback regarding content drop failure. In some cases, the one or more client-side modules are further configured to at least one of: present a drop zone indicator during movement of the clipboard UI element, the presented drop zone indicator showing where the stored selected piece of content would be inserted if the clipboard UI element was dropped at that moment; and in response to the local storage including multiple pieces of content, present a user interface mechanism configured to receive a choice of one or more of those pieces, and the stored selected piece of content that is inserted at the target location is the one or more chosen pieces.

The foregoing description of example embodiments of the invention has been presented for the purposes of illustration and description. It is not intended to be exhaustive or to limit the invention to the precise forms disclosed. Many modifications and variations are possible in light of this disclosure.

It is intended that the scope of the invention be limited not by this detailed description, but rather by the claims appended hereto.

What is claimed is:

1. A computer implemented method for editing a page in a client-server arrangement, the method comprising:
   allocating, by a client computing system, session storage local to the client computing system for use by a browser;
   receiving, by the client computing system, a page served to the browser from a server computing system with which the client computing system is in communication;
   allocating, by the client computing system, clipboard storage within the session storage;
   receiving, by the client computing system, input corresponding to either a copy operation or a cut operation, the input indicating a piece of content presented on the page that is selected for either the copy operation or the cut operation;
   copying, by the client computing system in response to receiving the input corresponding to either the copy operation or the cut operation, the selected piece of content to the clipboard storage within the session storage of the browser;
   presenting, by the client computing system, a clipboard user interface (UI) element on the page; and
   in response to the clipboard UI element being moved to and dropped at a target location, inserting the stored selected piece of content at the target location.

2. The method of claim 1 wherein the method further comprises presenting a drop zone indicator during movement of the clipboard UI element, the presented drop zone indicator showing where the stored selected piece of content would be inserted if the clipboard UI element was dropped at that moment.

3. The method of claim 1 wherein the method is carried out by code embedded within the page and executable in the browser of the client computing system.

4. The method of claim 1, further comprising:
   receiving, at the client computing system, a user input associated with the selected piece of content, thereby causing the copying and presenting to be carried out.

5. The method of claim 1 wherein in response to the session storage including multiple pieces of content, the method further comprises presenting a user interface mechanism configured to receive a choice of one or more of those pieces, and the stored selected piece of content that is inserted at the target location is the one or more chosen pieces.

6. A non-transitory computer program product encoded with instructions that when executed by one or more processors cause a process for editing a page in a client-server arrangement to be carried out, the process comprising:
   allocating, by a client computing system, session storage local to the client computing system for use by a browser;
   receiving, by the client computing system, a page served to the browser from a server computing system with which the client computing system is in communication;
   allocating, by the client computing system, clipboard storage within the session storage;
   receiving, by the client computing system, input corresponding to either a copy operation or a cut operation, the input indicating a piece of content presented on the page that is selected for either the copy operation or the cut operation;

copying, by the client computing system in response to receiving the input corresponding to either the copy operation or the cut operation, the selected piece of content to the clipboard storage within the session storage of the browser;

presenting, by the client computing system, a clipboard user interface (UI) element on the page; and in response to the clipboard UI element being moved to and dropped at a target location, inserting the stored selected piece of content at the target location.

7. The non-transitory computer program product of claim 6 wherein in response to the clipboard UI element being moved to and dropped at the target location, the process further comprises:

executing a post request to the server computing system, the post request including the stored selected piece of content; and receiving a response to the post request indicating a status of the post request.

8. The non-transitory computer program product of claim 7 wherein in response to the status indicating the post request was successful, the process further comprises:

executing a get request to the server computing system, the get request requesting the server computing system to return content resulting from the post request;

receiving a response to the get request including the requested content resulting from the post request; and refreshing content of the target location with the requested content.

9. The non-transitory computer program product of claim 7 wherein the response to the post request includes content resulting from server processing of the post request, and the process further comprises refreshing content of the target location with that content.

10. The non-transitory computer program product of claim 7 wherein in response to the status indicating the post request was not successful, the process further comprises at least one of:

removing the content inserted at the target location; and
presenting visual feedback regarding content drop failure.

11. The non-transitory computer program product of claim 6 wherein the target location is on a different page than the page with the selected piece of content.

12. The non-transitory computer program product of claim 6 wherein the process further comprises presenting a drop zone indicator during movement of the clipboard UI element, the presented drop zone indicator showing where the stored selected piece of content would be inserted if the clipboard UI element was dropped at that moment.

13. The non-transitory computer program product of claim 6 wherein the process is carried out by code embedded within the page and executable in the browser of the client computing system.

14. The non-transitory computer program product of claim 6, the process further comprising:

receiving, at the client computing system, a user input associated with the selected piece of content, thereby causing the copying and presenting to be carried out.

15. The non-transitory computer program product of claim 6 wherein in response to the session storage including multiple pieces of content, the process further comprises presenting a user interface mechanism configured to receive a choice of one or more of those pieces, and the stored selected piece of content that is inserted at the target location is the one or more chosen pieces.

16. A system for editing a page in a client-server arrangement, the system comprising:

one or more client-side applications executable in a browser of a client computer and configured to:
allocate session storage local to the client computer for use by the browser;
receive a page served to the browser from a server computer with which the client computer is in communication;
allocate clipboard storage within the session storage;
receive input corresponding to either a copy operation or a cut operation, the input indicating a piece of content presented on the page that is selected for either the copy operation or the cut operation;
copy the selected piece of content to the clipboard storage within the session storage of the browser at the client computer in response to receiving the input corresponding to either the copy operation or the cut operation;
present a clipboard user interface (UI) element on the page; and
in response to the clipboard UI element being moved to and dropped at a target location, insert the stored selected piece of content at the target location, wherein the server computer is configured to serve the page and the one or more client-side applications to the browser of the client computer, and the one or more client-side applications are embedded within the page.

17. The system of claim 16 wherein in response to the clipboard UI element being moved to and dropped at the target location, the one or more client-side applications are further configured to:

execute a post request to the server computer, the post request including the stored selected piece of content; and
receive a response to the post request indicating a status of the post request.

18. The system of claim 17 wherein in response to the status indicating the post request was successful, the one or more client-side applications are further configured to:

execute a get request to the server computer, the get request requesting the server computer to return content resulting from the post request;
receive a response to the get request including the requested content resulting from the post request; and
refresh content of the target location with the requested content.

19. The system of claim 17 wherein the response to the post request includes content resulting from server processing of the post request, and the one or more client-side applications are further configured to refresh content of the target location with that content.

20. The system of claim 17 wherein in response to the status indicating the post request was not successful, the one or more client-side applications are further configured to at least one of:

remove the content inserted at the target location; and
present visual feedback regarding content drop failure.

21. The system of claim 16 wherein the one or more client-side applications are further configured to at least one of:

present a drop zone indicator during movement of the clipboard UI element, the presented drop zone indicator showing where the stored selected piece of content would be inserted if the clipboard UI element was dropped at that moment; and in response to the session storage including multiple pieces of content, present a user interface mechanism configured to receive a choice of one or more of those pieces, and the stored selected piece of content that is inserted at the target location is the one or more chosen pieces.

* * * * *